United States Patent
Tse (10) Patent No.: US 11,254,272 B2
(45) Date of Patent: Feb. 22, 2022

(54) VEHICLE SAFETY

(71) Applicant: Ho Keung Tse, Hong Kong (HK)

(72) Inventor: Ho Keung Tse, Hong Kong (HK)

( * ) Notice: Subject to any disclaimer, the term of this patent is extended or adjusted under 35 U.S.C. 154(b) by 0 days.

(21) Appl. No.: 15/929,449

(22) Filed: May 4, 2020

(65) Prior Publication Data

US 2021/0268983 A1 Sep. 2, 2021

(51) Int. Cl.
*B60R 21/0134* (2006.01)
*B60R 21/01* (2006.01)

(52) U.S. Cl.
CPC ........... *B60R 21/0134* (2013.01); *B60R 2021/01013* (2013.01)

(58) Field of Classification Search
CPC ............ B60R 21/0134; B60R 2021/01013
See application file for complete search history.

(56) References Cited

U.S. PATENT DOCUMENTS

| | | | | |
|---|---|---|---|---|
| 3,695,629 A * | 10/1972 | Schlanger | | B62D 39/00 280/730.1 |
| 3,831,998 A * | 8/1974 | Hewitt | | B62D 1/19 296/35.2 |
| 5,959,552 A * | 9/1999 | Cho | | B60R 19/38 340/903 |
| 7,721,837 B1 * | 5/2010 | DeVeau | | B62D 39/00 180/274 |
| 10,427,631 B1 * | 10/2019 | Jimenez | | B60R 19/00 |
| 10,611,412 B1 * | 4/2020 | Attia | | B62D 24/02 |
| 2003/0069677 A1 * | 4/2003 | Boran | | B60R 21/0132 701/45 |
| 2006/0043712 A1 * | 3/2006 | Hakki | | B60R 19/205 280/735 |

FOREIGN PATENT DOCUMENTS

| | | | | | |
|---|---|---|---|---|---|
| CN | 1944109 | * | 4/2007 | ............ | B60R 21/02 |
| CN | 103587487 | * | 2/2014 | ............ | B60R 19/02 |
| CN | 205971195 | * | 5/2016 | ............ | B60R 21/02 |
| CN | 106143381 | * | 11/2016 | ........ | B60R 21/0136 |
| CN | 205971195 U | * | 2/2017 | | |
| CN | 104842916 B | * | 4/2018 | .......... | B60R 21/013 |
| DE | 4442877 A1 | * | 6/1996 | ............ | B62D 47/00 |
| DE | 19817992 | * | 12/1999 | ............ | B60R 21/02 |
| DE | 10250290 | * | 5/2004 | ............ | B62D 24/02 |
| WO | WO-2006102819 A1 | * | 10/2006 | ............ | B62D 24/00 |

\* cited by examiner

*Primary Examiner* — Peter D Nolan
*Assistant Examiner* — Kenneth M Dunne (57) ABSTRACT

A vehicle with a pod separable from a chassis therein, and when a collision detection system detects a collision or an imminent collision, the system will issue a signal to cause an electro-mechanical locking system to detach the pod, and further, to inflate airbags surrounding the pod.

20 Claims, 4 Drawing Sheets

VEHICLE SAFETY

CROSS-REFERENCE TO RELATED APPLICATIONS

This application is related to U.S. patent application Ser. No. 17/426,102 filed Jul. 28, 2021, which is derived from PCT International application PCT/IB2020/061837, filed on Dec. 11, 2020, on the grounds that they contain common subject matter.

This application is also related to another PCT International application PCT/IB2021/051670 filed on Mar. 1, 2021, on the grounds that they contain common subject matter.

This application is also related to a UK patent application GB 2007051.2 filed on May 13, 2020 and a China patent application 202010359207.3, filed on Apr. 29, 2020, on the grounds that they contain common subject matter. Actually the UK application shares the same English specification with the present US application, whereas the China application is a China translation of the English specification.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to protecting a vehicle, and particularly, to a vehicle with a pod, which may also be called as a cabin, separable from a chassis therein.

2. Description of Related Art of the Invention

Conventionally, passengers in a vehicle are protected by airbags in a collision, however, serious injuries are still unavoidable.

And, in the recent years, vehicles with their individual chassis separable from a pod therein are proposed by different automobile manufacturers.

For example, PCT patent application WO2021008874A1 of Rinspeed Inc. discloses transfer or exchange of a cabin of a vehicle, with an adjacent platform. However, it does not touch on an issue of how to protect a chassis of the vehicle, when separated from the cabin, from being intruded by another vehicle.

U.S. Pat. No. 8,041,483 and China utility model patent CN205971195U disclose using airbags to protect a vehicle and a cabin separated from a chassis, respectively, and their manner of protection is depending on the severity of an anticipated impact. The latter patent, in particular, discloses ejecting the cabin out of the vehicle.

BRIEF SUMMARY OF THE INVENTION

It is therefore an object of the present invention to provide a better protection to drivers and/or passengers, by protecting a pod which is used for carrying a driver and/or passengers, and will be separated from a chassis of a vehicle, in an accident.

To achieve the object, the present invention as defined by claim 1 can similarly move a pod partly or completely out of a vehicle, to escape from an accident. And, in what way the pod should be moved, or not to be moved, depends not only on information of a collision impact detected, but also nearby objects detected, such as a pedestrian or a vehicle.

It is therefore another object of the present invention to protect a chassis of a vehicle from intrusion by another vehicle, when the vehicle is not carrying a pod.

The invention as defined by claim 17 achieves the object. Specifically, it provides an anti-intrusion system, configured to move or extend an impact resisting/absorbing device, for preventing entry of another vehicle into a space left by the detached pod, in the chassis.

It is therefore a further object of the present invention to move a pod out of a chassis, safely and smoothly.

The invention as defined by claim 16 achieves the object. Specifically, it provides an apparatus to determine which part of the pod is being moved out of the chassis and inflate airbags for protecting the bottom of the moved out part.

DETAILED DESCRIPTION OF THE INVENTION

Figure 1:
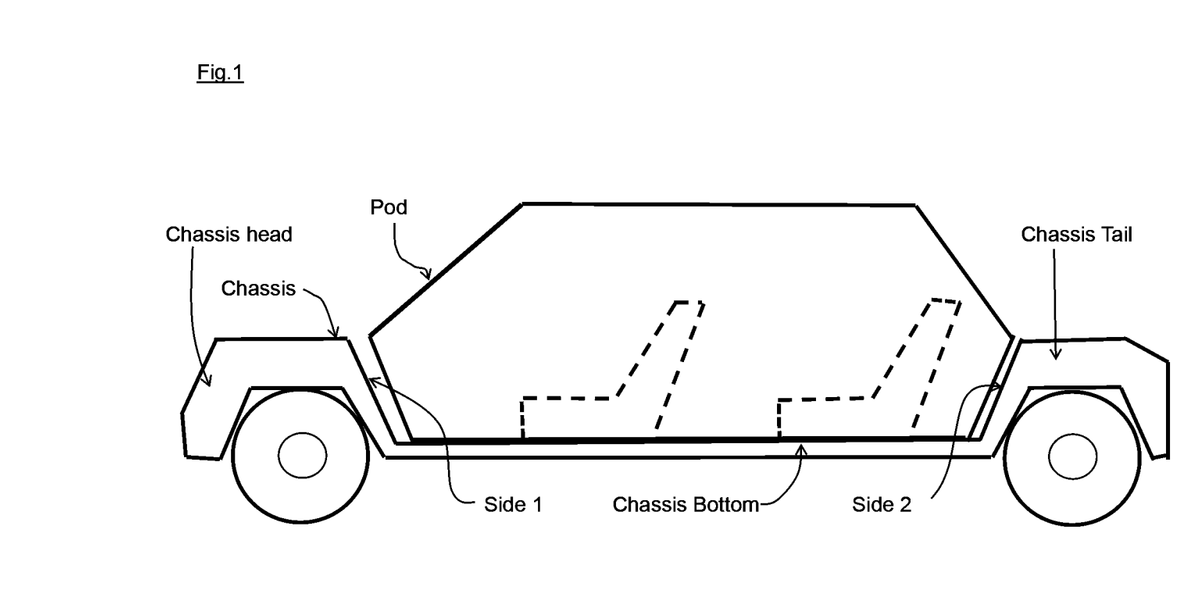
FIG. 1 is a symbolic diagram of an exemplified vehicle with a pod separable from a chassis therein.

According to the first embodiment of the present invention and referring to FIG. 1, in an exemplified vehicle, a pod is detachably secured to a chassis by an attachment and detachment device which may be a multi-point electromechanical locking system, and when a safety system detects or anticipates a collision, it will issue a signal, to firstly cause the attachment and detachment device to detach the pod from the chassis, as well as a collision detection signal, as will be discussed herein below in details.

The safety system can use any of a variety of technologies including but not limited to a shock/impact sensor, camera, a LiDAR system, infra-red sensor system, radar system (including but not limited to millimeter wave radar, noise radar, micro-power impulse radar, and ultra wideband radar), acoustical system, artificial intelligence system or a combination of these, and may include a crash anticipatory unit such as the one as disclosed in U.S. Pat. No. 8,041,483.

As shown in FIG. 1, the pod is in a form of a trapezium or trapezoid or U-shaped male wedge inserted into the chassis.

Figure 2:
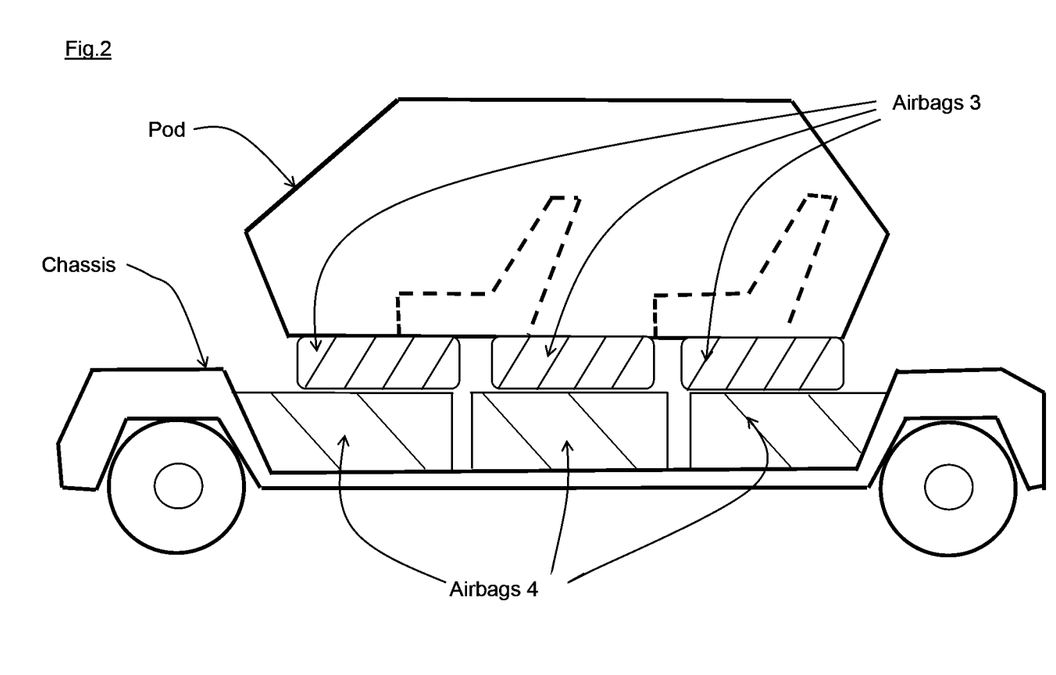
FIG. 2 is a symbolic diagram of an exemplified vehicle with a pod separated from a chassis therein, and airbags disposed beneath the pod are inflated.

And, referring to FIG. 2, airbags 3 and 4 are disposed on the pod and the chassis respectively, and therefore, the airbags 3 will move with the pod and continue to protect the pod, in a collision. Both airbags 3 and 4, when inflated, will respectively occupy a space below the pod and above the chassis bottom, and therefore, airbags 3 and 4 can be used to raise the pod up, separately or collectively, if the pod is detached from the chassis and not being moved away from the chassis.

If the safety system detects/anticipates is a front, head-on or forward collision, or back or rear-end collision, it will issue a collision detection signal, says, first collision detection signal, for inflating airbags 3 and 4.

On the other hand, it will issue a second collision detection signal for inflating airbags 3 only, and airbags 4 is not inflated, if the collision detected/anticipated is a side impact.

Note that other conventional cushion devices may be used instead of airbags 3 and/or 4.

When inflated, airbags 3 and 4 should desirably but not necessarily altogether raise the pod up to a level above the chassis, to avoid the pod from crashing against the chassis if it is caused to be moved forward or backward (that is, longitudinal direction), by the detected/anticipated impact directly or indirectly which is frontal or from the back, and this depends very much on the inclination of the side 1 or side 2 of the chassis, both of which enclose the front and rear of the pod, and a smaller inclination can better facilitate the pod's upward movement and thereby, preventing the crash, refers to FIGS. 1 and 2.

However, the inflation of the airbags 4 would be unnecessary when a side impact occurs/is to occur, because this simply means the pod will be unnecessarily dropped from a higher level to ground. The reason is that the pod can be moved away from the chassis by the side impact, in directions 13 or 14, without being raised up by airbags 4, as the chassis have no side wall there to enclose the two sides (sides 15, 16) of the pod and prevent the movement, see FIG. 4.

As to airbags 3, they are used for reducing any possible frictions between the pod and the chassis and facilitating the pod to be moved in any directions in related to the chassis, before the pod is completely moved out of the chassis, as well as for, absorbing shock when the pod hits ground.

As an alternative, either the head or tail of the chassis, is flush with or substantially flush with the chassis bottom, and therefore, would not prevent movement of the pod when its airbag 3 is inflated to facilitate movement. The above-mentioned usage of airbags 4 is still advantageous for facilitating the pod to be moved toward and above the non-flush part of the vehicle which is the tail or head correspondingly, and which is higher than the chassis bottom. Referring to FIG. 1 for a better understanding of the positions of chassis head and tail, note that both are non-flush.

And, the safety system will issue a first collision detection signal for inflating airbags 3 and 4, if the impact detected/anticipated would force the pod to move towards the non-flush part, and will issue a second detection collision signal for inflating airbags 3 only, if the impact detected/anticipated would force the pod to move towards the flush part.

Figure 3:
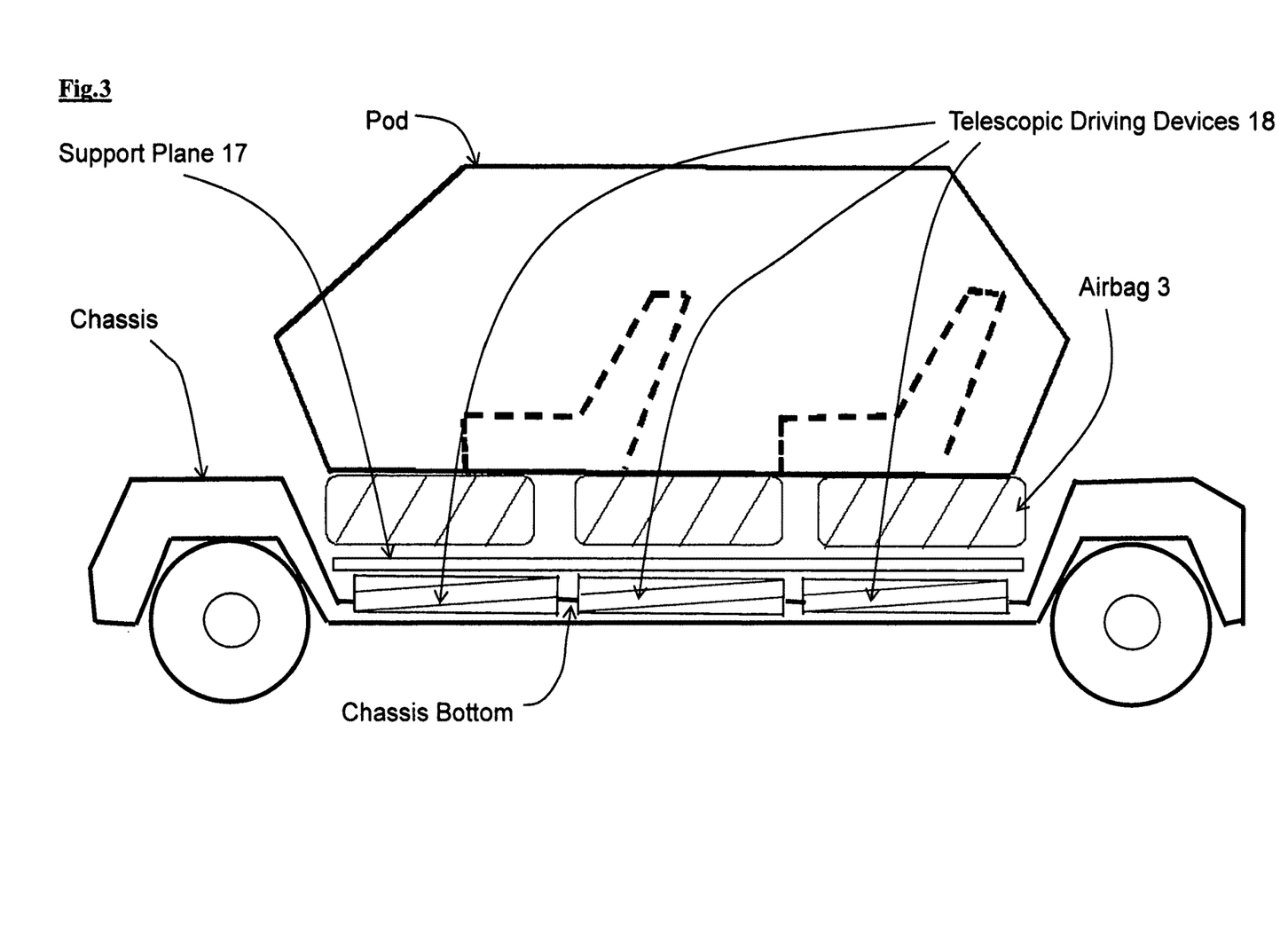
FIG. 3 is a symbolic diagram of a chassis of an exemplified vehicle, with a support plane 17 for raising up a pod thereon.

According to the second embodiment and referring to FIG. 3, a vertically movable support plane 17 is provided, and it lays flat on the chassis bottom, when no accident, to allow the pod resting on it be detachably secured to the chassis. The first collision detection signal will cause mechanical or hydraulic or pressurized fluid device(s) (not shown in FIG. 3), or the like, to extend the telescopic driving devices 18, thereby moving the support plane 17 upward, for facilitating the above-mentioned movement of the pod towards the non-flush part.

In the first and second embodiments, airbags 4 and/or support plane 17 and/or telescopic driving devices 18 may itself/themselves, or with additional reinforcing material and/or structure, be capable of acting as an impact resisting and/or absorbing device to minimize/prevent intrusion by an external object into the vehicle. And, if a side impact on the vehicle is detected/anticipated by the safety system, it will issue a collision detection signal, says, third collision detection signal, to cause airbags 4 be inflated, or the mechanical or hydraulic or fluid pressurizing device(s) to extend the telescopic driving devices 18, so as to raising up the side of the support plane 17 facing the side impact.

The telescopic driving devices 18 at the other side not facing the side impact may or may not be caused by the third collision detection signal to be extended to the same extent, and if not extended or extended by a comparatively small extent, the support plane 17 will be tilted in such a way that it will facilitate or cause the pod to slip in a direction far from the side impact.

If support plane 17 is to be tilted, the third collision detection signal will contain information indicative of which side (side 15 or side 16, refer to FIG. 4) of the support plane 17 is/will be impacted or should be raised up, and for causing the telescopic driving devices 18 at the side as indicated be extended, and telescopic driving devices 18 at the other side not extended or extended by a comparatively small extent.

Note that the safety system may use a tilt sensor, for e.g., a pendulum or MEMS (Micro-Electro-Mechanical Systems) type, to detect the degree of tilting of the vehicle, which may be caused by the accident, or by the unevenness of the lane on which the vehicle is using, and basing on the tilting detected, the safety system will include an adjustment information into the third collision detection signal, so as to cause telescopic driving devices 18 to introduce a corresponding compensational adjustment on the tilting of support plane 17.

Desirably, a pressure sensor may be disposed on support plane 17 to detect if the pod is moved completely out of support plane 17, and if it is, the pressure sensor will issue a signal to the safety system which in response, will cause telescopic driving devices 18 at the other side be extended equally to the side facing impact, so that support plane 17 is no longer tilted. But if support plane 17 is not raised up, is not tilted, or is raised up to a comparatively little extent (caused by the first collision detection signal, to facilitate the pod's longitudinal movement), then it will be raised up, or further raised up, without tilting.

As a result, support plane 17 and telescopic driving devices 18 can both occupy or at least better occupy the empty space created when the pod is moved away from the chassis and thus, preventing intrusion of external object, says, a vehicle, into the chassis.

Any traditional techniques for elevating and tilting a platform, can be applied in support plane 17 and telescopic driving devices 18, and U.S. Pat. Nos. 6,085,670 and 5,400,720 are incorporated herein by reference, they provide illustrative, non-limiting examples. The former patent discloses a universally tiltable platform system which is built by stacking a number of uni-directional tiltable platforms, whereas the latter patent discloses a scissor lift mechanism for uplifting a tiltable table.

Figure 4:
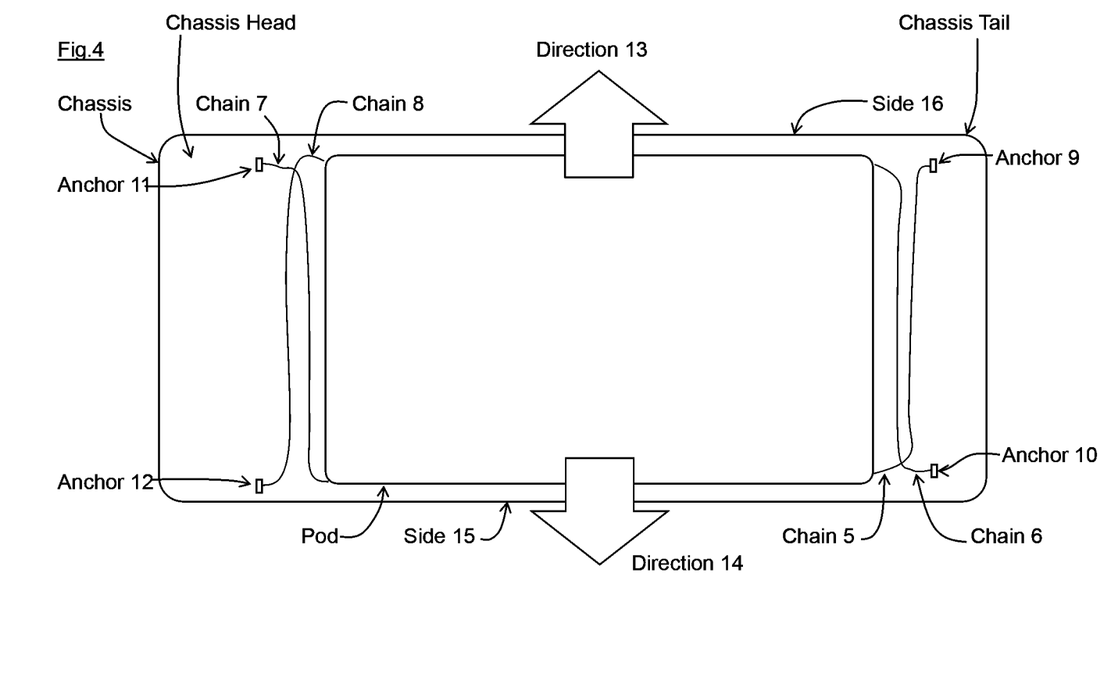
FIG. 4 is a symbolic diagram of an exemplified vehicle with a pod separable from a chassis therein, viewed from above.

According to a third embodiment and referring to FIG. 4, for simplicity and by way of example, the exemplified vehicle has no airbags 3, 4, support plane 17, or telescopic driving devices 18. The pod is connected with the chassis with chains (alternatively, steel cable or the like) 5, 6, 7, 8, and they are for moving the pod, when the pod is detached from the chassis in the above-mentioned manner.

Each chain has one end respectively attached to a different corner, says, corner A, or to a position close to corner A, of the pod, and the other end of each chain is respectively attached to a different anchor installed on the chassis, and the anchor is close to a corner of the pod, which is adjacent to corner A. And, each chain will cause the pod to move in a direction towards the anchor it attached, if retracted.

When the safety system detects/anticipates a side impact, on side 15 or 16, it will issue respectively corresponding signals to cause an electro-mechanical device to retract both chains 5 and 7, or both chains 6 and 8 correspondingly, as well as to cause another electro-mechanical device to release/cut off both chains 6 and 8, or both chains 5 and 7 correspondingly, thereby, causing the pod to move in direction 13 or 14 correspondingly.

Alternatively, other conventional driving mechanism may be used to move the pod in direction 13 or 14.

Further, when the pod is moved completely or substantially out of the chassis, the electro-mechanical device may completely release or cut off the retracted chains, so that the chains will not hinder the movement of the pod relative to the chassis, when the pod or the chassis is hit by, or itself hits, an external object, etc.

Note that the third embodiment may be combined with any of the above and below embodiments/examples/modifications/alternatives or a combination thereof. For example, airbags 3 may be included in the third embodiment and be inflated instantaneously, gradually or progressively, before or when the pod is caused to move out of the chassis.

In one particular implementation, servo motors with capability of providing rotor movement information are used, and by rotating their rotors to which the chains are connected respectively thereto, both chains 5, 7, or both chains 6, 8 can be retracted, for causing the pod to move in direction 13 or 14 correspondingly, and basing on the rotor movement information, the safety system can determine or continuously determine, before the pod is dropped from the chassis bottom and hits ground, which part of the pod has been moved out of the chassis, and accordingly, causing the airbags 3 disposed on the bottom of the moved-out part which may not be inflated at all, or partially/partly inflated, to be all inflated to their full extent, or full operational extent, to occupy a space below the bottom of the moved-out part. Other traditional method may be alternatively used for determining the position of the pod relative to the chassis.

U.S. Pat. No. 5,773,820 is incorporated herein by reference, it provides illustrative, non-limiting examples of rotor/shaft angular position sensors. Notes that such sensors can provide rotor movement information, even if it is caused by movement of the pod by an external impact, as this movement, depending on its direction 13 or 14, will further respectively pull the corresponding above-mentioned both chains 6,8, or both chains 5,7. Specifically, when each chain is pulled at its one end connected to and by the pod, a portion of it at the other end which being coiled around a rotor of a corresponding servo motor disposed at the chassis, which acts as an anchor in FIG. 4, will be uncoiled gradually and causing the rotor to be rotated. And, airbags 3 may also caused to be inflated in the above-mentioned manner, by using position of the pod relative to the chassis, obtained from the rotor movement information generated by this rotation.

Note that the airbags in this invention may borrow the technologies used in conventional vehicle airbags for reducing impact in accidents.

And, U.S. Pat. No. 7,591,481 is also incorporated herein by reference, it provides illustrative, non-limiting examples of flow control mechanisms of pressurized fluid, usable in the present invention for selectively and gradually inflating the airbags 3 and/or 4.

As a modification of any of the above and below embodiments/examples/modifications/alternatives or a combination thereof, before causing the pod to move in direction 13 or 14, or longitudinally, or any movement, the safety system determines if the movement will lead to less loss of lives, injuries, damages to properties, etc., which may be owing to the detected/anticipated impact directly or indirectly on the pod, or any possible impact by the moved pod to a pedestrian or by another vehicle to the moved pod, etc., when the pod is moved partly or wholly on a vehicle lane or pedestrian path which may be adjacent to the lane used by the vehicle to which the pod pertains, or in the vicinity thereof. If not, it will cause no movement. And therefore, the safety system is capable of detecting and identifying objects on the adjacent path, lane, nearby areas, or the like, and may include conventional lane change assist and/or autonomous driving techniques, and the safety system is also capable of assessing losses of lives and/or property damages would be resulted by the movement, and no movement of the pod, basing on the results of detection and identification of the objects, and information related to the collision detected or anticipated.

As a modification of any of the above and below embodiments/examples/modifications/alternatives or a combination thereof, the safety system may cause the pod to move in direction 13 or 14, even when the detected/anticipated impact is not a side impact, but is frontal or from the back or the like, if it determines that such a movement will lead to less loss of lives and/or property damages, etc. Otherwise, no movement.

As a modification of any of the above and below embodiments/examples/modifications/alternatives or a combination thereof, the driving mechanism basing on chain retractions as disclosed in the third embodiment for moving the pod in lateral directions (directions 13 and 14 as indicated in FIG. 4), or a conventional driving mechanism, is also applied/adapted to move the pod in the longitudinal directions (forward or backward direction).

The safety system will cause the pod to move laterally or longitudinally, or plane movement, or any combination thereof, and to an extent, such as, partly or wholly out of the chassis, if it determines in the above-mentioned manner that such a movement will lead to less loss of lives and/or property damages, etc. Otherwise, no movement.

On the other hand, the safety system will cause support plane 17 be raised up and/or tilted, and/or airbags 3, 4 be inflated, for achieving the above-mentioned purposes, such as, preventing intrusion of an external object into the chassis. But this should not be done if will cause adverse effect on a movement of the pod, intended or expected by the safety system, if any.

As an alternative, the above-mentioned automatic longitudinal direction and/or the lateral direction movement of the pod, is also controllable, or can be caused to happen or disabled by respective human commands received by the safety system.

As a modification of any of the above and below embodiments/examples/modifications/alternatives or a combination thereof, after the pod is partly or wholly moved, laterally and/or longitudinally and/or in plane movement, or any combination thereof, out of the chassis and leaving a space originally occupied when the pod is detachably secured to the chassis, as mentioned above, become empty, the safety system determines the space so left, by using the above-mentioned technique for determination of pod position relative to the chassis, or by using the above-mentioned pressure sensor to detect if the pod is moved completely out of support plane 17, then directly or indirectly, and in the above-mentioned manner, causes the above-mentioned airbags 4 and/or support plane 17 and/or telescopic driving devices 18 and/or cushion devices and/or impact resisting/absorbing devices and/or intrusion prevention devices to be inflated/extended/placed in a position such that they can provide/better provide their respective protection functions, and to occupy partly or wholly of the space left.

Note that in the above embodiments, the safety system may be installed in the chassis or the pod itself, and it may include the above-mentioned artificial intelligence system, as well as a processor, microprocessor or neural networks for performing crash anticipation related functions, including 'computer vision', as disclosed in U.S. Pat. No. 8,041,483.

And in one implementation, telescopic driving devices 18 may be disposed on side 1 and/or side 2 and/or chassis bottom (refer to FIG. 1), so as to push impact resisting/absorbing devices and/or intrusion prevention devices, which may be extendable/movable rigid structure, from different directions and positions. Also, conventional locking mechanisms should preferably be disposed on telescopic driving devices 18 and/or the extendable/movable rigid structures to lock them and prevent them from retracting/moving back, once they are moved/extended into the space left by the pod. Note that each telescopic driving device 18 may itself be an extendable rigid structure as well as an impact resisting/absorbing device.

Further, U.S. Pat. No. 6,601,719 is also incorporated herein by reference, it provides illustrative, non-limiting examples of a telescoping boom assembly with a locking and latching system.

As an alternative, telescopic driving devices 18 may be under internal pressure by pressurized fluid (or by spring action), and therefore whenever the pod is moved away and no matter in any direction and as long as it leaves a space, the telescopic driving devices 18 below the space will automatically be extended upward by the pressurized fluid to occupy at least a part of the space. In this alternative, the safety system does not detect pod position, instead when it detects or anticipates a collision, it will issue a signal to cause a fluid pressurizing device to supply pressurized fluid to telescopic driving devices 18.

As another alternative, support plane 17 is replaced by a planar or substantial planar truss (alternatively, frame structure), and interconnected with telescopic driving devices 18, and even though the pod may not be able to slide on it, raising up the truss would still prevent intrusion by an external object into the chassis.

It should be noted that the above embodiments/examples/modifications/alternatives are given by way of examples only, and it will be obvious to those skilled in the art that various changes and modifications may be made without departing from the spirit of the present invention.

What is claimed is:

1. An apparatus for enhancing safety of a land vehicle with a carrier for carrying at least one person, and said carrier is being laid on a supporting base of a main body of said vehicle, and is being detachably secured to said main body, for preventing any movement of said carrier in relative to said main body, said apparatus comprising:
    a first detection module designed to detect an impact or an imminent impact involving said vehicle, and to provide impact information related to said detected impact;
    a detaching module designed to be caused by said impact information directly or indirectly, to detach said carrier from said main body, so as to allow said carrier to be moved relative to said main body;
    a moving system designed to move said carrier, partly and/or completely out of said main body;
    a second detection module designed to detect objects external to said vehicle and being not related to said detected impact;
    an identification system designed to identify said objects;
    a predicting system designed to predict loss may be resulted for at least one manner of moving said carrier, and to predict loss may be resulted if said carrier is not to be moved, basing on said impact information, and results of said detection by said second detection module and said identification;
    a determining system configured to determine a manner for moving said carrier, if said predicted loss related to said manner is lower than said predicted loss related to no movement of said carrier, otherwise, make no said determination;
    wherein said moving system being designed to move said carrier in according to said manner determined, and if no said determination, then no movement of said carrier;
    wherein said carrier including no road-running wheel of said vehicle.

2. An apparatus as claimed in claim 1, wherein said moving system including at least one motor to directly or indirectly move said carrier, and said loss including loss of lives, injuries, and/or damages to properties.

3. An apparatus as claimed in claim 1, wherein said main body including a chassis of said vehicle, and said first detection module and said second detection module may be a same detection module, and said objects may include a pedestrian or another vehicle.

4. An apparatus as claimed in claim 1, wherein said moving system comprising a sub-system designed to raise up said supporting base, so as to enable said carrier which being laid on said supporting base, to be moved horizontally, or moved over, and not be hindered by, at least one upward protruding part of said main body.

5. An apparatus for enhancing safety of a land vehicle with a carrier which may be used for carrying at least one person, and said carrier is being laid on a position of a main body of said vehicle, and is being detachably secured to said main body, for preventing any movement of said carrier in relative to said main body, said apparatus comprising:
    an impact resisting/absorbing device, which being not an airbag and being not an inflatable bag type device, and relies on material strength of itself to resist a collision impact, not any fluid pressure inside, if any;
    wherein at least a part of said impact resisting/absorbing device being moved or extended, by an internal pressure, to occupy at least a part of a space left by a movement of said carrier, from said position, for preventing another vehicle from intruding into said space;

wherein said internal pressure exists before said movement of said carrier, and said movement or said extension of said at least a part of said impact resisting/absorbing device is being obstructed or prevented by said carrier only, when said carrier being in said position, and therefore, said movement or said extension of said at least a part of said impact resisting/absorbing device taking place in an automatic manner, when said carrier is being moved away from said position;

wherein said impact resisting/absorbing device is being disposed on said main body, not said carrier, and said carrier including no road-running wheel of said vehicle.

6. An apparatus as claimed in claim 5, wherein said carrier is being moved partly or completely out of said main body, by a means or system and/or a collision impact, directly or indirectly, and said main body including a chassis of said vehicle.

7. An apparatus as claimed in claim 5, wherein further comprising:
   a detection module designed to detect an impact or an imminent impact involving said vehicle, and to provide impact information related to said detected impact;
   a detaching module designed to be caused by said impact information directly or indirectly, to detach said carrier from said main body, so as to allow said carrier to be moved relative to said main body.

8. An apparatus as claimed in claim 7, wherein further comprising a fluid pressurizing module designed to create said internal pressure, activated by said impact information directly or indirectly.

9. An apparatus for enhancing safety of a land vehicle with a carrier for carrying at least one person, and said carrier is being laid on a main body of said vehicle, and is being detachably secured to said main body, for preventing any movement of said carrier in relative to said main body, said apparatus comprising:
   a movement detection system designed to determine if a part of said carrier is being moved out of said main body, and to provide moved-out information related to said part of said carrier determined;
   an activating system designed to be responsive to said moved-out information, to activate at least one shock-absorbing device, and thereby causing said shock-absorbing device to occupy a space or more space, not being previously occupied by said shock-absorbing device, below said moved out part, for absorbing shocks if said part of said carrier hits ground;
   wherein said at least one shock-absorbing device being disposed in said carrier and said carrier including no road-running wheel of said vehicle.

10. An apparatus as claimed in claim 9, wherein said activating system being an inflating system designed to be responsive to said moved-out information, to inflate said at least one shock-absorbing device which being at least one cushion device, and which will occupy a space below said part of said carrier when inflated, to full extent or full operational extent;
    wherein said at least one cushion device is not being inflated at all, or only partially or partly inflated, before said part of said carrier is being moved out of said main body.

11. An apparatus as claimed in claim 9, wherein said at least one cushion device being at least one airbag.

12. An apparatus as claimed in claim 9, wherein further comprising:
    a detection module designed to detect an impact or an imminent impact involving said vehicle, and to provide impact information related to said detected impact;
    a detaching module designed to be caused by said impact information directly or indirectly, to detach said carrier from said main body, so as to allow said carrier to be moved relative to said main body.

13. An apparatus as claimed in claim 9, wherein said carrier is being moved partly or completely out of said main body, by a means or system and/or a collision impact, directly or indirectly, and said main body including a chassis of said vehicle.

14. An apparatus for enhancing safety of a land vehicle with a carrier which may be used for carrying at least one person, and said carrier is being laid on a position of a supporting base of a main body of said vehicle, and is being detachably secured to said main body, for preventing any movement of said carrier in relative to said main body, said apparatus comprising:
    a position determining module configured to determine if said carrier is being moved partly and/or completely out of said main body, and to generate space information related to a space left by a movement of said carrier, from said position;
    an anti-intrusion system configured to move or extend at least a part of an impact resisting/absorbing device, basing on said space information, for preventing unwanted entry of another vehicle into said space;
    wherein said impact resisting/absorbing device is being disposed on said main body, not said carrier, and said carrier including no road-running wheel of said vehicle.

15. An apparatus as claimed in claim 14, wherein said position determining module is also being designed to determine if said carrier is being moved completely out of said supporting base, and if said carrier is, to issue a signal to cause directly or indirectly a raising system to move said supporting base to a height, for preventing another vehicle from intruding into said main body from at least one direction.

16. An apparatus as claimed in claim 14, wherein said position determining module comprising a first module configured to detect if said carrier is completely being moved out of said main body, and/or a second module configured to detect position of said carrier relative to said main body;
    wherein basing on said detection results of said first module and/or said second module, said position determining module generating said space information.

17. An apparatus as claimed in claim 14, wherein said at least a part of said impact resisting/absorbing device is being moved or extended into at least a part of said space.

18. An apparatus as claimed in claim 14, wherein further comprising a module configured to directly or indirectly locking said at least a part of said impact resisting/absorbing device, after said at least a part of said impact resisting/absorbing device having made said movement or extension, so that said at least a part of said impact resisting/absorbing device being unable to retract/move back to its original position.

19. An apparatus as claimed in claim 14, wherein further comprising:
    a detection module designed to detect an impact or an imminent impact involving said vehicle, and to provide impact information related to said detected impact;
    a detaching module designed to be caused by said impact information directly or indirectly, to detach said carrier from said main body, so as to allow said carrier to be moved relative to said main body.

20. An apparatus as claimed in claim 14, wherein said carrier is being moved partly or completely out of said main body, by a means or system and/or a collision impact, directly or indirectly, and said main body including a chassis of said vehicle.

\* \* \* \* \*

UNITED STATES PATENT AND TRADEMARK OFFICE
CERTIFICATE OF CORRECTION

PATENT NO. : 11,254,272 B2
APPLICATION NO. : 15/929449
DATED : February 22, 2022
INVENTOR(S) : Ho Keung Tse It is certified that error appears in the above-identified patent and that said Letters Patent is hereby corrected as shown below:

On the Title Page

Column 1, Add:
Foreign Application Priority Data:
Mar 1, 2020 [GB]    2002936
Mar 9, 2020 [GB]    2003360
Mar 12, 2020 [GB]    2003571
Mar 21, 2020 [GB]    2004142
Apr 16, 2020 [GB]    2005517

Signed and Sealed this
Third Day of September, 2024

Katherine Kelly Vidal
*Director of the United States Patent and Trademark Office*